United States Patent
Rios et al.

(10) Patent No.: US 10,690,159 B2
(45) Date of Patent: Jun. 23, 2020

(54) FASTENING SYSTEM WITH A WASHER HAVING AN ENLARGED BORE FACING A COMPOSITE PANEL

(71) Applicant: The Boeing Company, Chicago, IL (US)

(72) Inventors: Gianfranco Rios, Everett, WA (US); Madhavadas Ramnath, Mulkiteo, WA (US); Hamid Razi, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 148 days.

(21) Appl. No.: 15/710,692

(22) Filed: Sep. 20, 2017

(65) Prior Publication Data

US 2019/0085883 A1 Mar. 21, 2019

(51) Int. Cl.
| | | |
|---|---|---|
| *F16B 5/02* | (2006.01) | |
| *F16B 37/08* | (2006.01) | |
| *F16B 43/00* | (2006.01) | |
| *F16B 5/01* | (2006.01) | |

(52) U.S. Cl.
CPC ............ *F16B 5/02* (2013.01); *F16B 37/0807* (2013.01); *F16B 43/00* (2013.01); *F16B 5/01* (2013.01)

(58) Field of Classification Search
CPC ............... Y10T 403/75; Y10T 428/218; Y10T 428/219; F16B 5/01; F16B 5/02; F16B 43/00
USPC ...................................... 403/408.1; 411/531
See application file for complete search history.

(56) References Cited

U.S. PATENT DOCUMENTS

| | | | | |
|---|---|---|---|---|
| 3,431,687 A | * | 3/1969 | Fischer | ................... B24D 7/04 451/541 |
| 4,533,277 A | * | 8/1985 | Alexander | ............ F16B 5/0607 403/312 |
| 4,971,498 A | * | 11/1990 | Goforthe | ................. F16B 43/00 301/35.622 |
| 5,222,827 A | * | 6/1993 | Joanides | ................... F16B 5/01 403/388 |
| 5,975,821 A | * | 11/1999 | Kue | ........................ F16B 43/00 411/526 |
| 9,291,187 B2 | * | 3/2016 | Whitlock | .............. F16B 33/004 |
| 10,215,218 B2 | * | 2/2019 | Rizza | .................... F16B 39/282 |
| 2014/0321941 A1 | * | 10/2014 | Hufenbach | ............... F16B 5/01 411/337 |
| 2017/0234342 A1 | * | 8/2017 | Ayuzawa | ................ B29C 70/06 403/179 |
| 2018/0216644 A1 | * | 8/2018 | Mateo | ...................... B64F 5/10 |

OTHER PUBLICATIONS

Yan et al., "Response and Failure of Composite Plates With a Bolt-Filled Hole," U.S. Department of Transportation, Federal Aviation Administration, Washington, D.C., Interim Report, Jun. 1998, 79 pages.

* cited by examiner

*Primary Examiner* — Flemming Saether

(74) *Attorney, Agent, or Firm* — Yee & Associates, P.C.

(57) ABSTRACT

A fastening system comprises a fastener, a washer, and a collar. The fastener has a shaft extending through a hole in a composite panel. The washer is concentrically positioned on the shaft between a head of the fastener and the composite panel. The washer comprises an enlarged bore facing the composite panel. The enlarged bore is one of a chamfered bore or a countersunk bore. The collar secures the fastener relative to the composite panel.

20 Claims, 12 Drawing Sheets

FASTENING SYSTEM WITH A WASHER HAVING AN ENLARGED BORE FACING A COMPOSITE PANEL

BACKGROUND INFORMATION

1. Field

The present disclosure relates generally to composite joints, and more specifically, to bolted composite joints. Still more particularly, the present disclosure relates to fastening systems configured to increase a strength of composite joints.

2. Background

Composite materials are tough, light-weight materials created by combining two or more functional components. For example, a composite material may include reinforcing fibers bound in a polymer resin matrix. The fibers may be unidirectional or may take the form of a woven cloth or fabric. The fibers and resin are arranged and cured to form a composite material. Due to the controlled direction of fibers in a composite material, composite materials are anisotropic. Anisotropic materials have different values for a physical property in different orientations.

The anisotropic nature of composite materials increases the difficulty of joining composite panels. To join a composite panel to another composite panel or other material, holes are drilled within the composite panel. Holes and bolts installed within the holes may undesirably decrease the strength of the composite material. Transferring force to a composite panel through bolts in the composite panel may undesirably create inconsistencies in the composite panel.

Conventional composite joints may include a metal or composite strap. A strap may reduce clamp-up stress distribution in a conventional composite joint. However, using a strap may increase at least one of rework time, manufacturing cost, or composite joint weight.

Therefore, it would be desirable to have a method and apparatus that takes into account at least some of the issues discussed above, as well as other possible issues. For example, it may be desirable to provide an apparatus that increases the strength of a composite joint. As another example, it may be desirable to provide an apparatus to reduce the weight of composite joint.

SUMMARY

An illustrative embodiment of the present disclosure provides a fastening system comprises a fastener, a washer, and a collar. The fastener has a shaft extending through a hole in a composite panel. The washer is concentrically positioned on the shaft between a head of the fastener and the composite panel. The washer comprises an enlarged bore facing the composite panel. The enlarged bore is one of a chamfered bore or a countersunk bore. The collar secures the fastener relative to the composite panel.

Another illustrative embodiment of the present disclosure provides a composite joint comprises a composite panel and a plurality of fastening systems. The composite panel has a plurality of holes. Each fastening system of the plurality of fastening systems comprises a fastener, a washer, and a collar. The fastener has a shaft extending through a hole of the plurality of holes in the composite panel. The washer is concentrically positioned on the shaft between a head of the fastener and the composite panel. The washer comprises an enlarged bore facing the composite panel. The enlarged bore is one of a chamfered bore or a countersunk bore. The collar secures the fastener relative to the composite panel.

A further illustrative embodiment of the present disclosure provides a method. A shaft of a fastener is inserted through a washer so that the washer is concentrically positioned on the shaft. The shaft of the fastener is extended through a hole of a composite panel so that an enlarged bore of the washer faces the composite panel. The enlarged bore is one of a chamfered bore or a countersunk bore. A collar on the shaft is torqued so that the collar secures the fastener relative to the composite panel to form a fastening system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that for composite bolted joints, the Filled-Hole Tension (FHT) Design Value is often used to size aircraft structures. The illustrative embodiments recognize and take into account that improvement of Filled-Hole Tension (FHT) Design Values will have a direct impact on weight and recurring costs for airplanes.

The illustrative embodiments recognize and take into account that having a strap may increase rework time for a composite joint. The illustrative embodiments recognize and take into account that to rework a fastener extending through a strap, each fastener extending through the strap may be removed. The illustrative embodiments recognize and take into account that removing all of the fasteners through the strap increases the time to rework the composite joint. The illustrative embodiments recognize and take into account that it would be desirable to only remove fasteners that require rework.

The illustrative embodiments recognize and take into account that washers may be used in composite bolted joints. The illustrative embodiments recognize and take into account that increasing the diameter of the washer increases a surface area over which forces are introduced into a composite joint. The illustrative embodiments recognize and take into account that increasing a surface area over which forces are distributed into a composite joint increases filled-hole tensile strength.

The illustrative embodiments recognize and take into account that decreasing the weight of an aircraft is desirable. The illustrative embodiments recognize and take into account that decreasing the weight of an aircraft reduces fuel and other operational costs.

Figure 1:
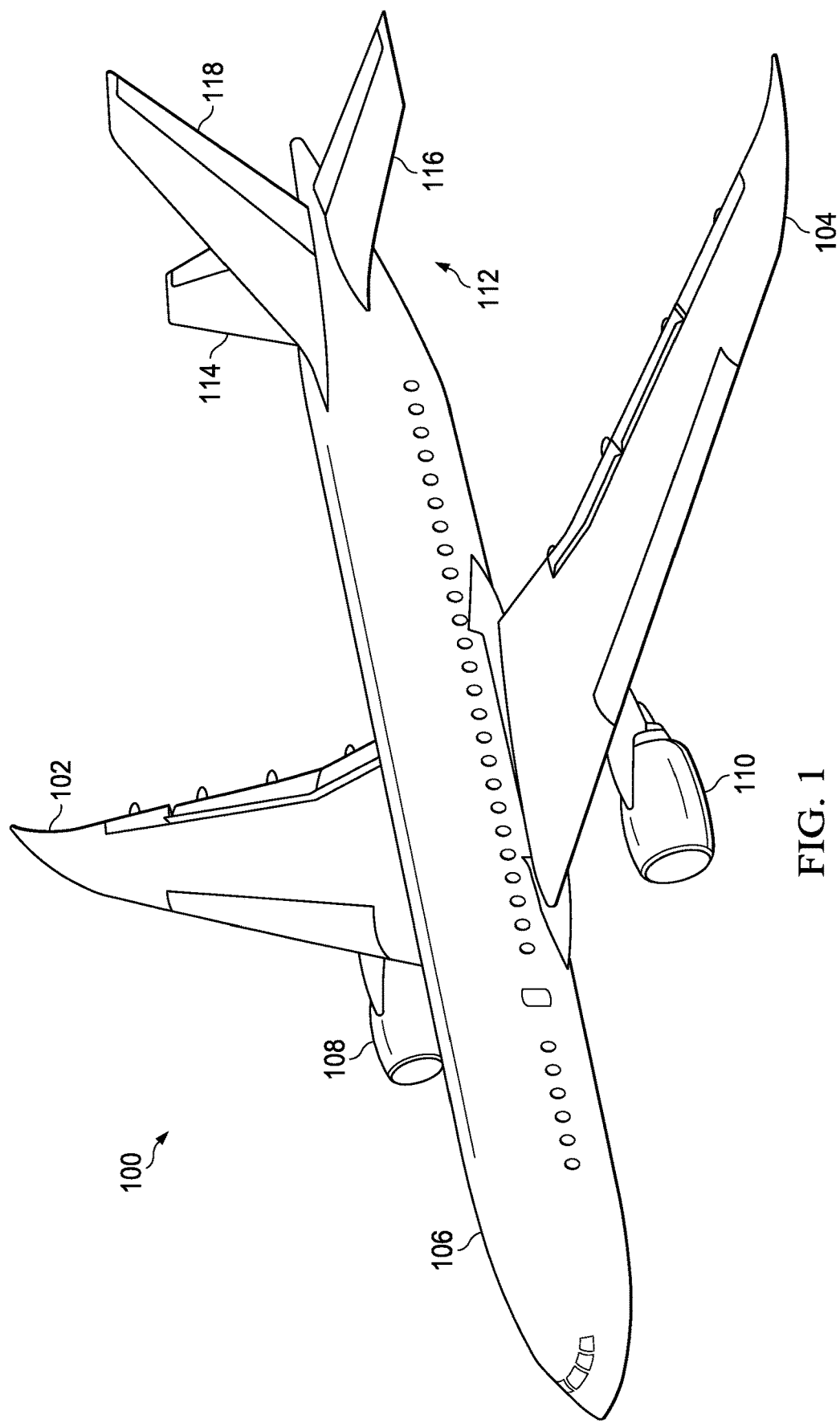
FIG. 1 is an illustration of an aircraft in which an illustrative embodiment may be implemented.

Referring now to the figures, and in particular, with reference to FIG. 1, an illustration of an aircraft is depicted in which an illustrative embodiment may be implemented. In this illustrative example, aircraft 100 has wing 102 and wing 104 connected to body 106. Aircraft 100 includes engine 108 connected to wing 102 and engine 110 connected to wing 104.

Body 106 has tail section 112. Horizontal stabilizer 114, horizontal stabilizer 116, and vertical stabilizer 118 are connected to tail section 112 of body 106.

Aircraft 100 is an example of a platform having fastening systems as described. For example, a composite joint of at least one of body 106, wing 102, or wing 104, may be assembled using fastening systems. As another example, fastening systems may be used to assemble composite structures of tail section 112, horizontal stabilizer 114, horizontal stabilizer 116, or vertical stabilizer 118.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

This illustration of aircraft 100 is provided for the purposes of illustrating one environment in which different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, rotorcraft, or other suitable types of aircraft.

Although the illustrative examples for an illustrative embodiment are described with respect to an aircraft, the illustrative embodiments may be applied to other types of platforms. The platform may be, for example, a mobile structure, a stationary structure, a land-based structure, an aquatic-based structure, or a space-based structure. More specifically, the platform may be a surface ship, a tank, a personnel carrier, a train, a spacecraft, a space station, a satellite, a submarine, a manufacturing facility, a building, or other suitable types of structures.

Figure 2:
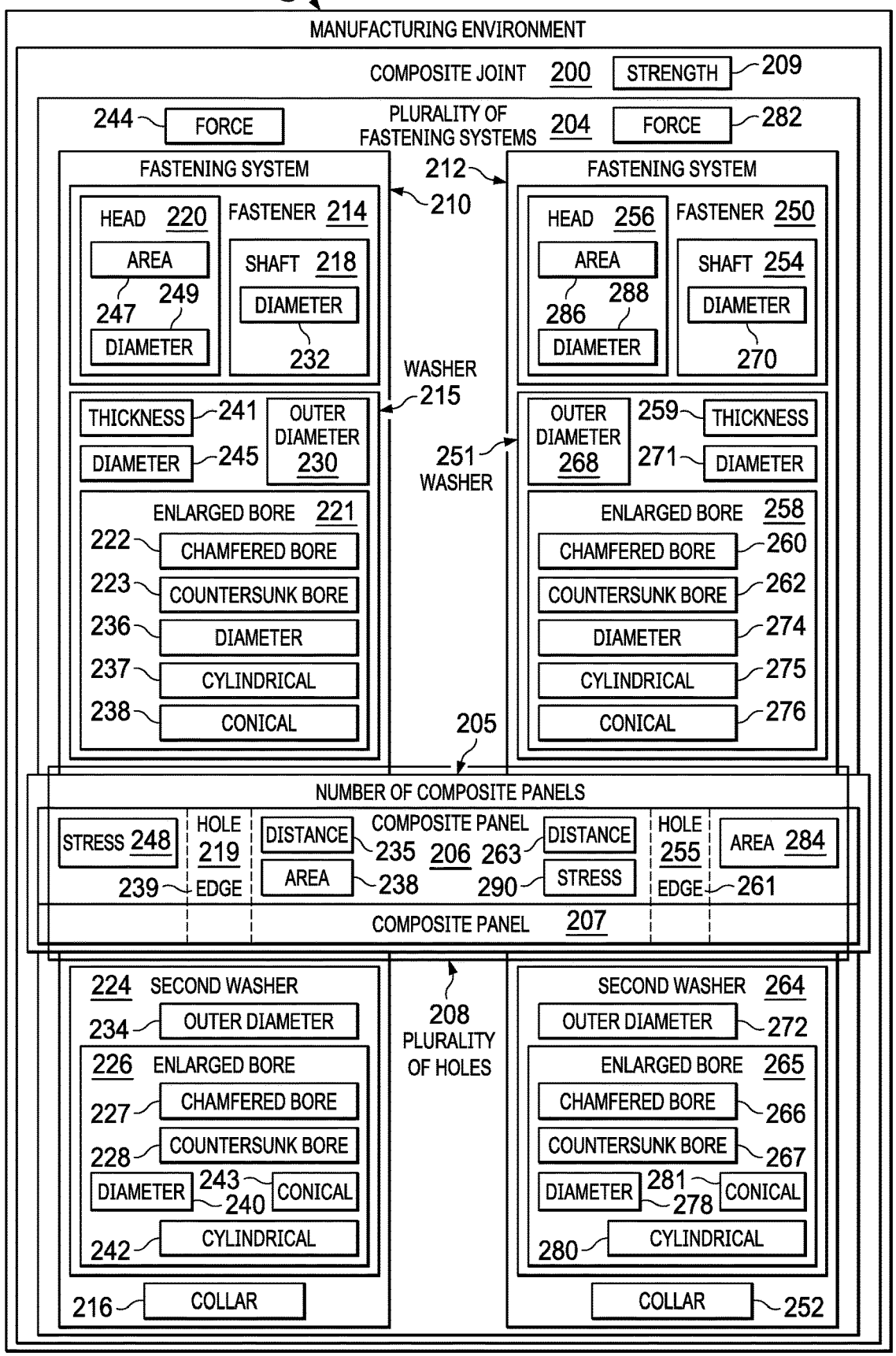
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Composite joint 200 is assembled within manufacturing environment 202 using plurality of fastening systems 204. In some illustrative examples, composite joint 200 is a joint in aircraft 100 of FIG. 1.

Composite joint 200 comprises number of composite panels 205 and plurality of fastening systems 204. Number of composite panels 205 includes any desirable quantity of composite panels. In this illustrative example, number of composite panels 205 includes composite panel 206 and composite panel 207. As depicted, plurality of holes 208 extend through composite panel 206 and composite panel 207.

Composite panel 206 has plurality of holes 208. Each fastening system of plurality of fastening systems 204 comprises a fastener, a washer, and a collar. Each fastener has a shaft extending through a hole of the plurality of holes in composite panel 206. Each washer is concentrically positioned on the shaft between a head of the fastener and composite panel 206. Each washer comprises an enlarged bore facing composite panel 206. The enlarged bore is one of a chamfered bore or a countersunk bore. The collar secures the fastener relative to composite panel 206.

Plurality of fastening systems 204 is configured to increase strength 209 of composite joint 200 from a filled-hole strength. In some illustrative examples, each of plurality of fastening systems 204 is configured to introduce forces from a respective fastener into a different area of composite panel 206 than would contact a head of the respective fastener. Plurality of fastening systems 204 has any desirable quantity of fastening systems.

As depicted, plurality of fastening systems 204 has fastening system 210 and fastening system 212. Fastening system 210 has fastener 214, washer 215, and collar 216. Fastener 214 has shaft 218 extending through hole 219 in composite panel 206. Hole 219 is one of plurality of holes 208. Washer 215 is concentrically positioned on shaft 218 between head 220 of fastener 214 and composite panel 206. Washer 215 comprises enlarged bore 221 facing composite panel 206. Enlarged bore 221 is one of chamfered bore 222 or countersunk bore 223. Collar 216 secures fastener 214 relative to composite panel 206.

Washer 215 is configured to reduce the weight of fastening system 210. At least one of thickness 241, outer diameter 230, or diameter 236 are selected to reduce the weight of fastening system 210 so that fastening system 210 weighs less than a fastening system with conventional washers. In some illustrative examples, thickness 241 is less than a thickness of a conventional washer used in a fastening system. In some illustrative examples, outer diameter 230 is less than an outer diameter of a conventional washer used in a fastening system. In some illustrative examples, diameter 236 of enlarged bore 221 is greater than a hole diameter of a standard washer.

As depicted, second washer 224 is concentrically positioned on shaft 218 between collar 216 and composite panel 206. Second washer 224 comprises enlarged bore 226 facing composite panel 206. Enlarged bore 226 is one of chamfered bore 227 or countersunk bore 228.

Second washer 224 is optional in some illustrative examples. In these illustrative examples, collar 216 contacts composite panel 207.

Washer 215 has outer diameter 230. In some illustrative examples, outer diameter 230 of washer 215 is greater than or equal to diameter 249 of head 220. In some illustrative examples, outer diameter 230 of washer 215 is greater than or equal to about 180% of diameter 232 of shaft 218. In some illustrative examples, outer diameter 230 of washer 215 and outer diameter 234 of second washer 224 are the same. In some illustrative examples, outer diameter 230 is less than an outer diameter of a conventional washer without enlarged bore 221.

Enlarged bore 221 has any desirable size or shape. Enlarged bore 221 is selected to introduce forces from fastener 214 away from edge 239 of hole 219. Enlarged bore 221 is selected to introduce forces from fastener 214 distance 235 from edge 239 of hole 219. Distance 235 is changed by changing diameter 236 of enlarged bore 221.

Conventional washers without enlarged bore 221 introduce forces from fastener 214 into composite panel 206 over an area including edge 239 of hole 219. Without washer 215, head 220 of fastener 214 would introduce forces from fastener 214 into composite panel 206 over an area including edge 239 of hole 219.

In some illustrative examples, enlarged bore 221 is selected to reduce the weight of washer 215. Enlarged bore 221 is selected such that enlarged bore 221 does not undesirably affect composite panel 206. For example, diameter 236 of washer 215 is selected to reduce cutting into composite panel 206. Diameter 236 is a largest diameter of enlarged bore 221. In some illustrative examples, each respective largest diameter of plurality of fastening systems 204 is in the range of 1.04 times of smallest diameter of the respective enlarged bore and 80% of an outer diameter of the respective washer.

Diameter 236 is in the range of 1.04 times diameter 245 of washer 215 to 0.80 times outer diameter 230 of washer 215. Diameter 245 is the smallest diameter of enlarged bore 221. Diameter 245 may also be referred to as a shank diameter. In some illustrative examples, diameter 236 is a standard countersink diameter for a conventional countersunk washer.

In some illustrative examples, enlarged bore 221 of washer 215 is cylindrical 237. In some illustrative examples, enlarged bore 221 of washer 215 is conical 238. When enlarged bore 221 is conical 238, the angle of enlarged bore 221 is any desirable angle such that diameter 236 is a desirable diameter.

In some illustrative examples, washer 215 is a commercially available washer. When washer 215 is commercially available, conical 238 enlarged bore 221 may have an angle of approximately 100 degrees.

In some illustrative examples washer 215 and second washer 224 have the same design. Second washer 224 is configured to have a lower weight than a standard washer. At least one dimension of second washer 224, such as a thickness, outer diameter 234, or diameter 240 are selected to reduce the weight of fastening system 210 so that fastening system 210 weighs less than a fastening system with conventional washers.

Second washer 224 has outer diameter 234. In some illustrative examples, outer diameter 234 of second washer 224 is greater than or equal to about 180% of diameter 232 of shaft 218.

Enlarged bore 226 has any desirable size or shape. Enlarged bore 226 is selected to introduce forces away from edge 239 of hole 219. Conventional washers without enlarged bore 226 introduce forces into composite panel 207 over an area including edge 239 of hole 219.

In some illustrative examples, enlarged bore 226 is selected to reduce the weight of second washer 224. Enlarged bore 226 is selected such that enlarged bore 226 does not undesirably affect composite panel 207. For example, diameter 240 of second washer 224 is selected to reduce cutting into composite panel 207. Diameter 240 is a largest diameter of enlarged bore 226.

Diameter 240 is in the range of 1.04 times a smallest diameter of enlarged bore 226 of second washer 224 to 0.80 times outer diameter 234 of second washer 224. The smallest diameter of enlarged bore 226 may also be referred to as a shank diameter. In some illustrative examples, diameter 240 is a standard countersink diameter for a conventional countersunk washer.

In some illustrative examples, enlarged bore 226 of second washer 224 is cylindrical 242. In some illustrative examples, enlarged bore 226 of second washer 224 is conical 243. When enlarged bore 226 is conical 243, the angle of enlarged bore 226 is any desirable angle such that diameter 240 is a desirable diameter.

In some illustrative examples, second washer 224 is a commercially available washer. When second washer 224 is commercially available, conical 243 enlarged bore 226 may have an angle of approximately 100 degrees.

Fastening system 210 is configured to introduce force 244 from fastener 214 into a different area of composite panel 206 than would contact head 220 of fastener 214. Fastening system 210 is configured to introduce force 244 from fastener 214 into area 246 around hole 219. Area 246 begins distance 235 from hole 219. In some illustrative examples, area 246 may be equal to or less than area 247 of head 220, but increases the tensile strength of composite joint 200 due to moving force 244 away from edge 239 of hole 219.

In some illustrative examples, a distance from the edge for each of plurality of fastening systems 204 is determined by a respective largest diameter of a respective enlarged bore of a respective washer. For example, distance 235 is determined by diameter 245 of enlarged bore 236 of washer 215. As another example, distance 263 is determined by diameter 274 of enlarged bore 258 of washer 251. In some illustrative examples, when second washer 224 and second washer 264 are not present, collar 216 and collar 252 may introduce forces into composite panel 207 at edge 239 of hole 219 and edge 261 of hole 255 while washer 215 and washer 251 introduce forces into area 238 and area 284.

When force 244 is applied to fastener 214, washer 215 creates a smaller stress 248 in composite panel 206 due to force 244 than head 256 of fastener 214 without washer 215. Fastening system 210 improves stress 248 performance of hole 219.

Fastening system 212 has fastener 250, washer 251, and collar 252. Fastener 250 has shaft 254 extending through hole 255 in composite panel 206. Hole 255 is one of plurality of holes 208. Washer 251 is concentrically positioned on shaft 254 between head 256 of fastener 250 and composite panel 206. Washer 251 comprises enlarged bore 258 facing composite panel 206. Enlarged bore 258 is one of chamfered bore 260 or countersunk bore 262. Collar 252 secures fastener 250 relative to composite panel 206.

Washer 251 is configured to reduce the weight of fastening system 212. At least one of thickness 259, outer diameter 268, or diameter 274 are selected to reduce the weight of fastening system 212 so that fastening system 212 weighs less than a fastening system with conventional washers. In some illustrative examples, thickness 259 is less than a thickness of a conventional washer used in a fastening system. In some illustrative examples, outer diameter 268 is less than an outer diameter of a conventional washer used in a fastening system. In some illustrative examples, diameter 274 of enlarged bore 258 is greater than a hole diameter of a standard washer.

As depicted, second washer 264 is concentrically positioned on shaft 254 between collar 252 and composite panel 206. Second washer 264 comprises enlarged bore 265 facing composite panel 206. Enlarged bore 265 is one of chamfered bore 266 or countersunk bore 267.

Second washer 264 is optional in some illustrative examples. In these illustrative examples, collar 252 contacts composite panel 206.

Washer 251 has outer diameter 268. In some illustrative examples, outer diameter 268 of washer 251 is greater than or equal to diameter 288 of head 256. In some illustrative examples, outer diameter 268 of washer 251 is greater than or equal to about 180% of diameter 270 of shaft 254. In some illustrative examples, outer diameter 268 of washer 251 and outer diameter 272 of second washer 264 are the same. In some illustrative examples, outer diameter 268 is less than an outer diameter of a conventional washer without enlarged bore 258.

Enlarged bore 258 has any desirable size or shape. Enlarged bore 258 is selected to introduce forces from fastener 250 away from edge 261 of hole 255. Enlarged bore 258 is selected to introduce forces from fastener 250 distance 263 from edge 261 of hole 255. Distance 263 is changed by changing diameter 274 of enlarged bore 258.

Conventional washers without enlarged bore 258 introduce forces from fastener 250 into composite panel 206 over an area including edge 261 of hole 255. Without washer 251, head 256 of fastener 250 would introduce forces from fastener 250 into composite panel 206 over an area including edge 261 of hole 255.

In some illustrative examples, enlarged bore 258 is selected to reduce the weight of washer 251. Enlarged bore 258 is selected such that enlarged bore 258 does not undesirably affect composite panel 206. For example, diameter 274 of washer 251 is selected to reduce cutting into composite panel 206. Diameter 274 is a largest diameter of enlarged bore 258.

Diameter 274 is in the range of 1.04 times diameter 271 of washer 251 to 0.80 times outer diameter 268 of washer 251. Diameter 271 is the smallest diameter of enlarged bore 258. Diameter 271 may also be referred to a shank diameter. In some illustrative examples, diameter 274 is a standard countersink diameter for a conventional countersunk washer.

In some illustrative examples, enlarged bore 258 of washer 251 is cylindrical 275. In some illustrative examples, enlarged bore 258 of washer 251 is conical 276. When enlarged bore 258 is conical 276, the angle of enlarged bore 258 is any desirable angle such that diameter 274 is a desirable diameter.

In some illustrative examples, washer 251 is a commercially available washer. When washer 251 is commercially available, conical 276 enlarged bore 258 may have an angle of approximately 100 degrees.

In some illustrative examples washer 251 and second washer 264 have the same design. Second washer 264 is configured to have a lower weight than a standard washer. At least one dimension of second washer 264, such as a thickness, outer diameter 272, or diameter 278 are selected to reduce the weight of fastening system 212 so that fastening system 212 weighs less than a fastening system with conventional washers.

Second washer 264 has outer diameter 272. In some illustrative examples, outer diameter 272 of second washer 264 is greater than or equal to about 180% of diameter 270 of shaft 254.

Enlarged bore 265 has any desirable size or shape. Enlarged bore 265 is selected to introduce forces away from edge 261 of hole 255. Conventional washers without enlarged bore 265 introduce forces into composite panel 207 over an area including edge 261 of hole 255.

In some illustrative examples, enlarged bore 265 is selected to reduce the weight of second washer 264. Enlarged bore 265 is selected such that enlarged bore 265 does not undesirably affect composite panel 207. For example, diameter 278 of second washer 264 is selected to reduce cutting into composite panel 207. Diameter 278 is a largest diameter of enlarged bore 265.

Diameter 278 is in the range of 1.04 times a smallest diameter of enlarged bore 265 of second washer 264 to 0.80 times outer diameter 272 of second washer 264. The smallest diameter of enlarged bore 265 may also be referred to as a shank diameter. In some illustrative examples, diameter 278 is a standard countersink diameter for a conventional countersunk washer.

In some illustrative examples, enlarged bore 265 of second washer 264 is cylindrical 280. In some illustrative examples, enlarged bore 265 of second washer 264 is conical 281. When enlarged bore 265 is conical 281, the angle of enlarged bore 265 is any desirable angle such that diameter 278 is a desirable diameter.

In some illustrative examples, second washer 264 is a commercially available washer. When second washer 264 is commercially available, conical 281 enlarged bore 265 may have an angle of approximately 100 degrees.

Fastening system 212 is configured to introduce force 282 from fastener 250 into a different area of composite panel 206 than would contact head 256 of fastener 250. Fastening system 212 is configured to introduce force 282 from fastener 250 into area 284 around hole 255. Area 284 begins distance 263 from hole 255. In some illustrative examples, area 284 may be equal to or less than area 286 of head 220, but increases the tensile strength of composite joint 200 due to moving force 282 away from edge 261 of hole 255.

When force 282 is applied to fastener 250, washer 251 creates a smaller stress 290 in composite panel 206 due to force 282 than head 256 of fastener 250 without washer 251. Fastening system 212 improves stress 290 performance of hole 255.

Fastening system 210 and fastening system 212 may also reduce at least one of the time or the cost of reworks. Washer 215 and washer 251 may compensate for mis-installation of fastener 214 and fastener 250. When removal and rework of a fastener, such as fastener 214 or fastener 250, is performed, removal of the faster is faster than when a strap is present. Presence of washer 215 rather than a strap reduces the time to remove and replace fastener 214. Presence of washer 251 rather than a strap reduces the time to remove and replace fastener 250.

The illustration of manufacturing environment 202 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
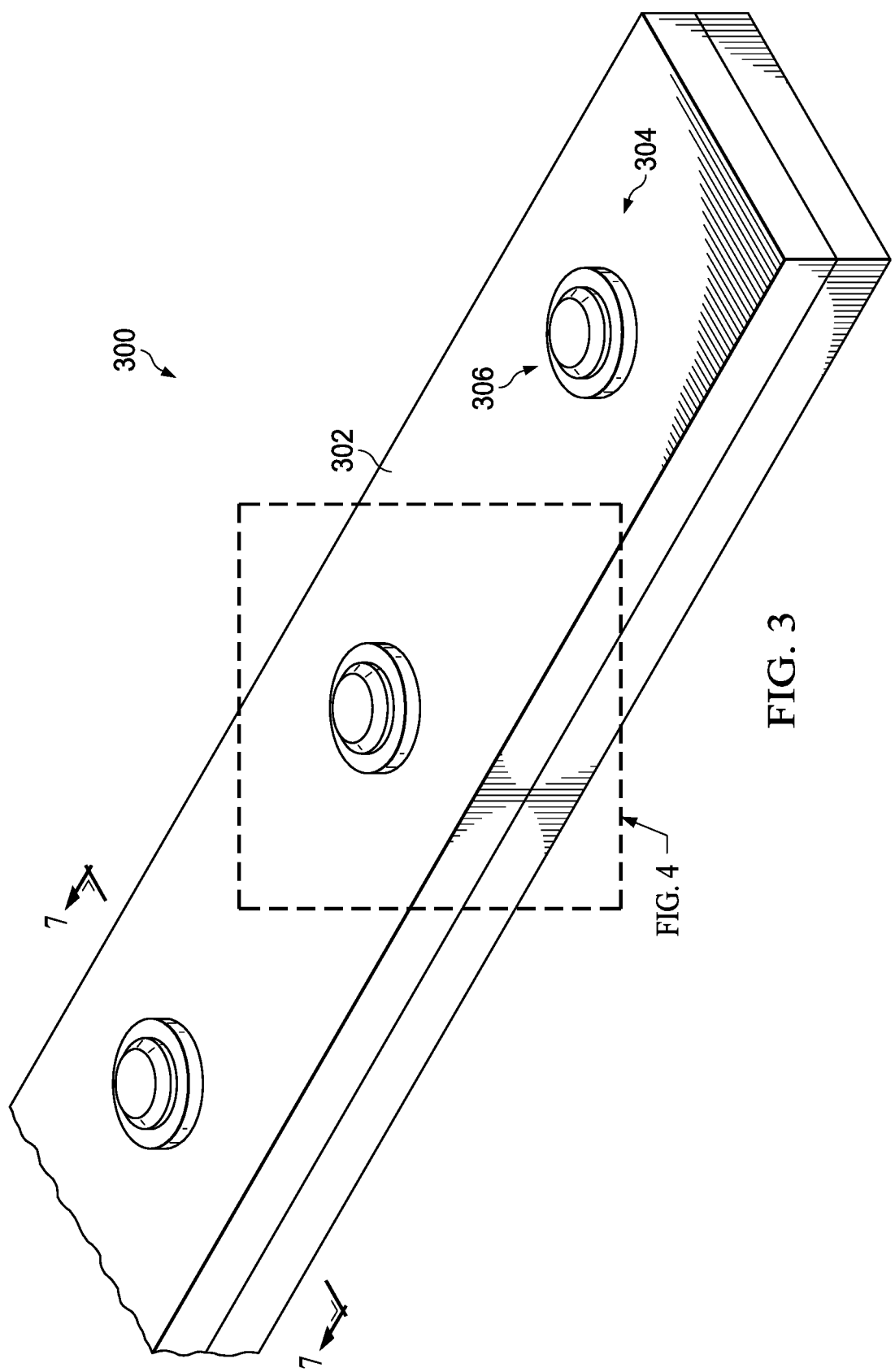
FIG. 3 is an illustration of an isometric view of an assembled composite joint in accordance with an illustrative embodiment.

Turning now to FIG. 3, an illustration of an isometric view of an assembled composite joint is depicted in accordance with an illustrative embodiment. Composite joint 300 is a physical implementation of composite joint 200 of FIG. 2. In some illustrative examples, composite joint 300 is a composite joint in a component of aircraft 100.

Composite joint 300 has composite panel 302 and plurality of fastening systems 304. Composite panel 302 has plurality of holes 306. Each fastening system of plurality of fastening systems 304 comprises a fastener having a shaft extending through a hole of plurality of holes 306 in composite panel 302. Each fastening system of plurality of fastening systems 304 also has a washer concentrically positioned on the shaft between a head of the fastener and composite panel 302.

Although not visible in FIG. 3, each washer comprises an enlarged bore (not depicted) facing composite panel 302. The enlarged bore is one of a chamfered bore or a countersunk bore.

In some illustrative examples, each of plurality of fastening systems 304 is the same as each other fastening system of plurality of fastening systems 304. In other illustrative examples, one of plurality of fastening systems 304 may differ from at least one other fastening system of plurality of fastening systems 304. Plurality of fastening systems 304 is configured to increase a strength of composite joint 300 from a filled-hole strength. Each of plurality of fastening systems 304 is configured to introduce forces from a respective fastener into composite panel 302 a distance from an edge of a respective hole of plurality of holes 306.

Composite panel 302 obscures at least one component of each of plurality of fastening systems 304. For example, each of plurality of fastening systems 304 has a respective collar securing the fastener relative to composite panel 302. Composite panel 302 also obscures the shaft of each fastener of plurality of fastening systems 304.

In some illustrative examples, each of plurality of fastening systems 304 further comprises a second washer concentrically positioned on the shaft between the collar and composite panel 302. In some illustrative examples, the second washer comprises an enlarged bore facing the composite panel, wherein the enlarged bore is one of a chamfered bore or a countersunk bore.

Figure 4:
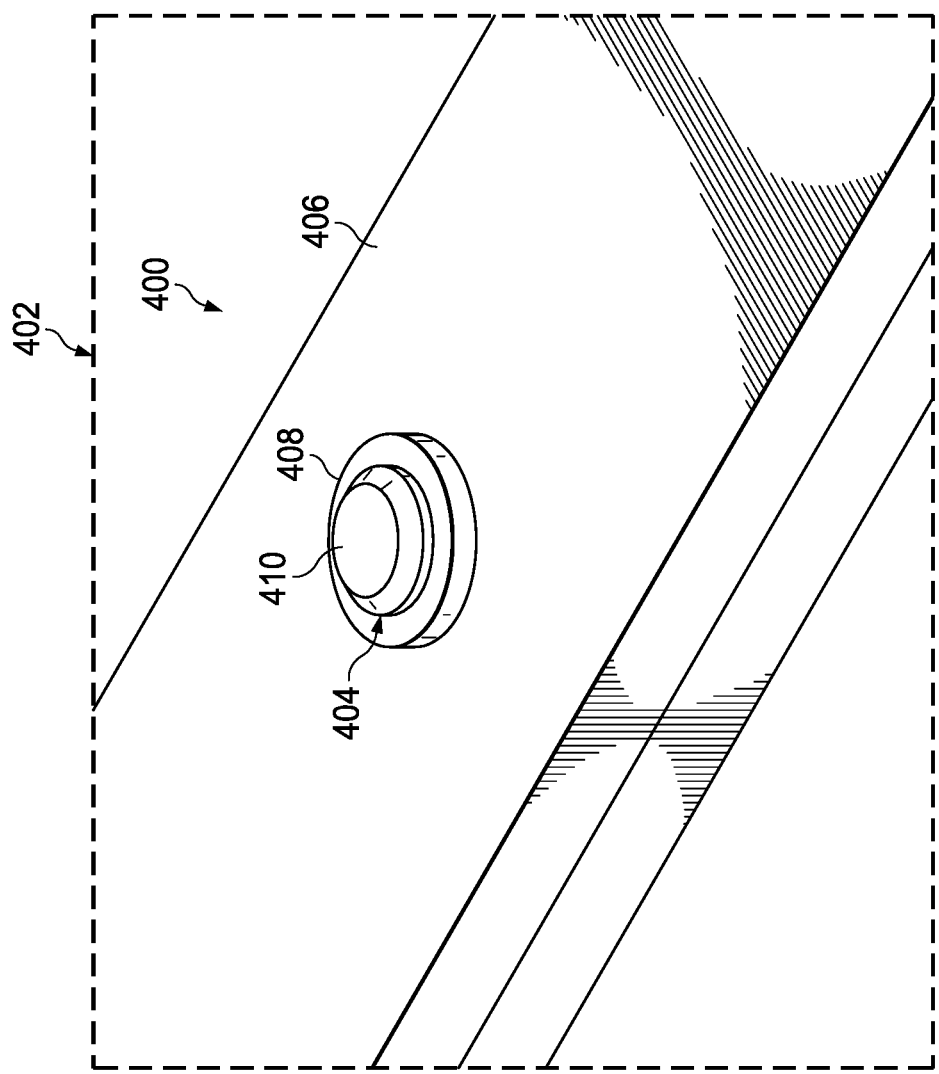
FIG. 4 is an illustration of an isometric view of an assembled fastening system of a composite joint in accordance with an illustrative embodiment.

Turning now to FIG. 4, an illustration of an isometric view of an assembled fastening system of a composite joint is depicted in accordance with an illustrative embodiment. Fastening system 400 is a physical implementation of fastening system 210 of FIG. 2. In some illustrative examples, fastening system 400 is one of plurality of fastening systems 304 of FIG. 3. For example, view 402 of fastening system 400 may be a view within box 4-4 of FIG. 3.

Fastening system 400 comprises fastener 404 having a shaft extending through a hole in composite panel 406. Washer 408 is concentrically positioned on the shaft between head 410 of fastener 404 and composite panel 406.

Figure 5:
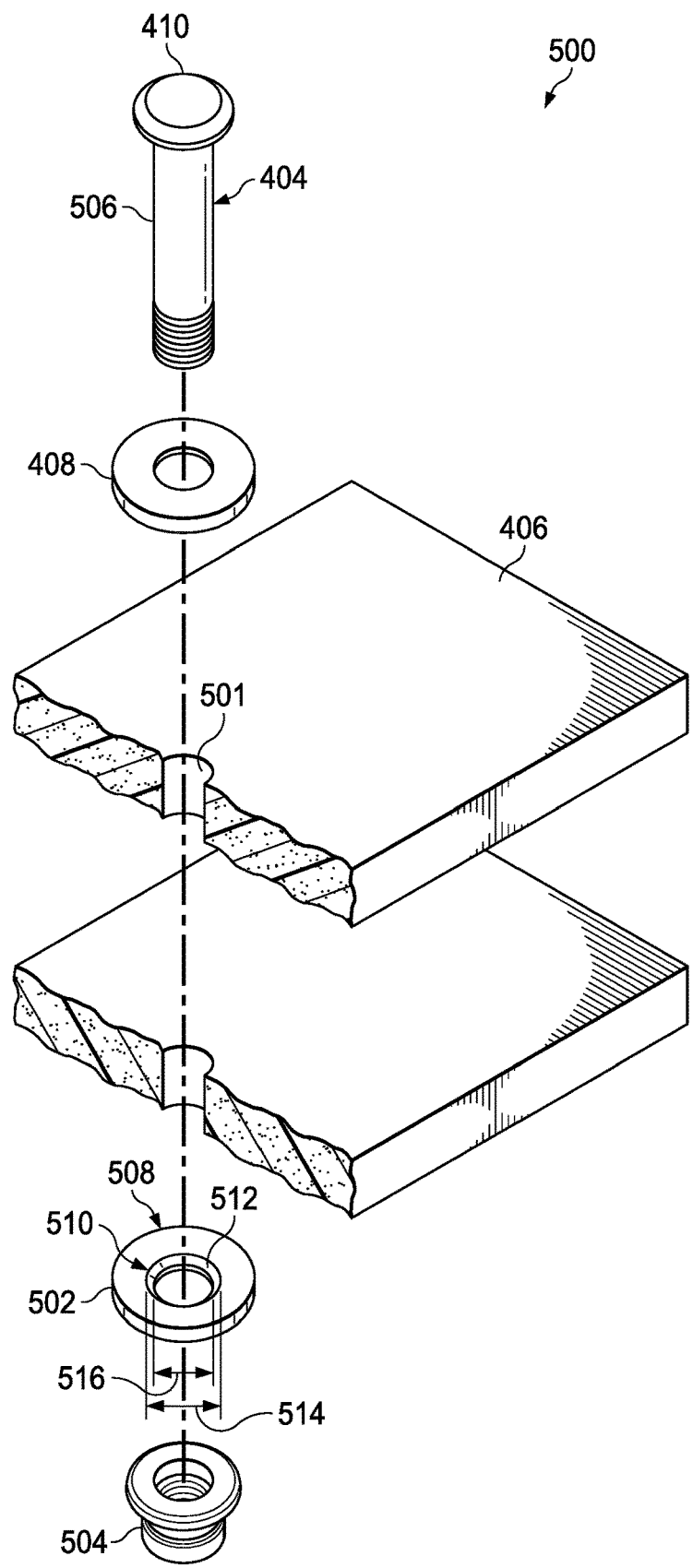
FIG. 5 is an illustration of a top exploded view of a fastening system in accordance with an illustrative embodiment.

Turning now to FIG. 5, an illustration of a top exploded view of a fastening system is depicted in accordance with an illustrative embodiment. View 500 is a top exploded view of fastening system 400 of FIG. 4.

In view 500, hole 501, second washer 502, and collar 504 are visible. When assembled, collar 504 secures fastener 404 relative to composite panel 406.

When fastening system 400 is assembled, second washer 502 is concentrically positioned on shaft 506 between collar 504 and composite panel 406. When fastening system 400 is assembled, shaft 506 extends through hole 501 of composite panel 406.

As depicted, second washer 502 comprises enlarged bore 508 facing composite panel 406. Enlarged bore 508 is one of a chamfered bore or a countersunk bore. As depicted, enlarged bore 508 is conical 510 countersunk bore 512.

Enlarged bore 508 has diameter 514 and diameter 516. Diameter 514 is the largest diameter of enlarged bore 508. Diameter 516 is the smallest diameter of enlarged bore 508. In some illustrative examples, diameter 516 may be referred to as a shank diameter.

In some illustrative examples, diameter 516 is substantially the same as a diameter of hole 501. In some illustrative examples, diameter 516 is substantially the same as a diameter of shaft 506 of fastener 404.

Figure 6:
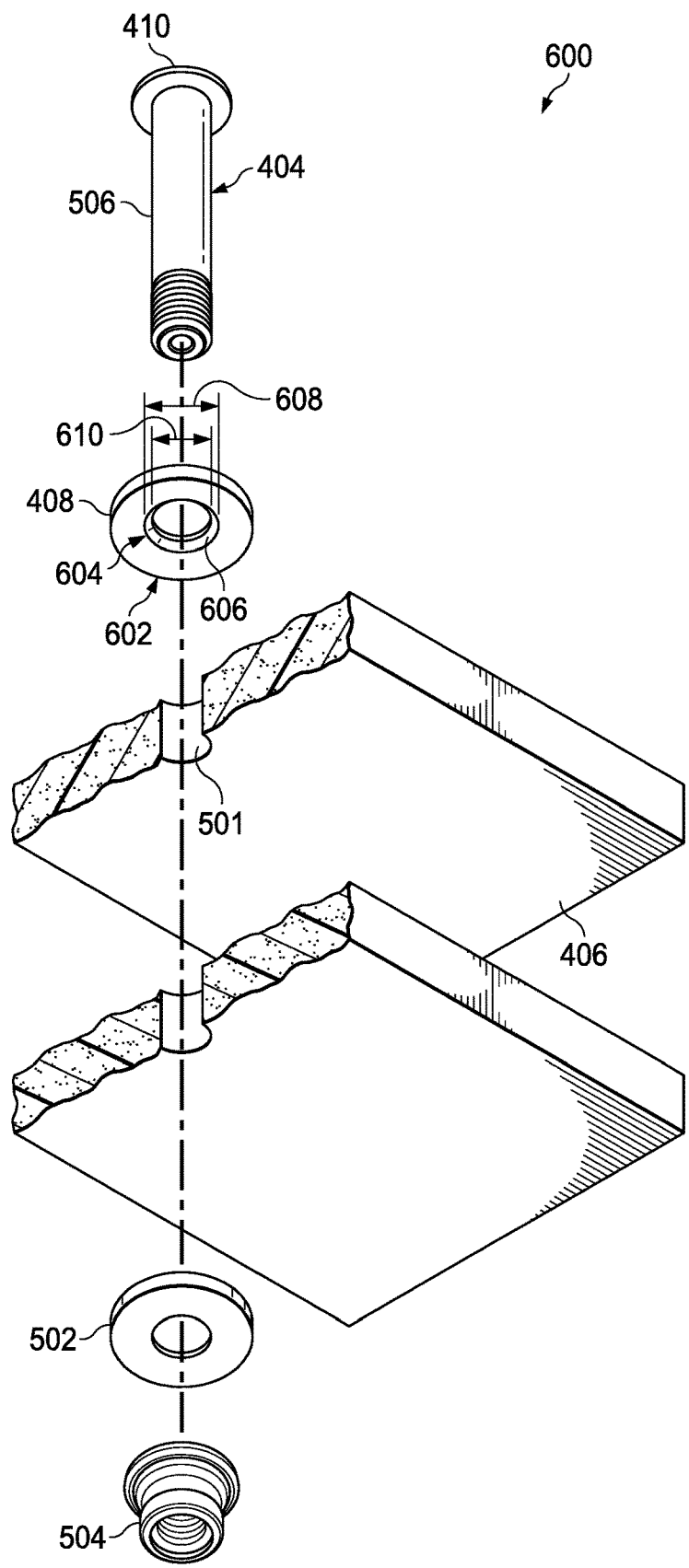
FIG. 6 is an illustration of a bottom exploded view of a fastening system in accordance with an illustrative embodiment.

Turning now to FIG. 6, an illustration of a bottom exploded view of a fastening system is depicted in accordance with an illustrative embodiment. View 600 is a bottom exploded view of fastening system 400 of FIG. 4.

In view 600, enlarged bore 602 of washer 408 is visible. When fastening system 400 is assembled, enlarged bore 602 faces composite panel 406. Enlarged bore 602 is one of a chamfered bore or a countersunk bore. As depicted, enlarged bore 602 is conical 604 countersunk bore 606.

Enlarged bore 602 has diameter 608 and diameter 610. Diameter 608 is the largest diameter of enlarged bore 602. Diameter 610 is the smallest diameter of enlarged bore 602. In some illustrative examples, diameter 610 may be referred to as a shank diameter.

In some illustrative examples, diameter 610 is substantially the same as a diameter of hole 501. In some illustrative examples, diameter 610 is substantially the same as a diameter of shaft 506 of fastener 404.

Figure 7:
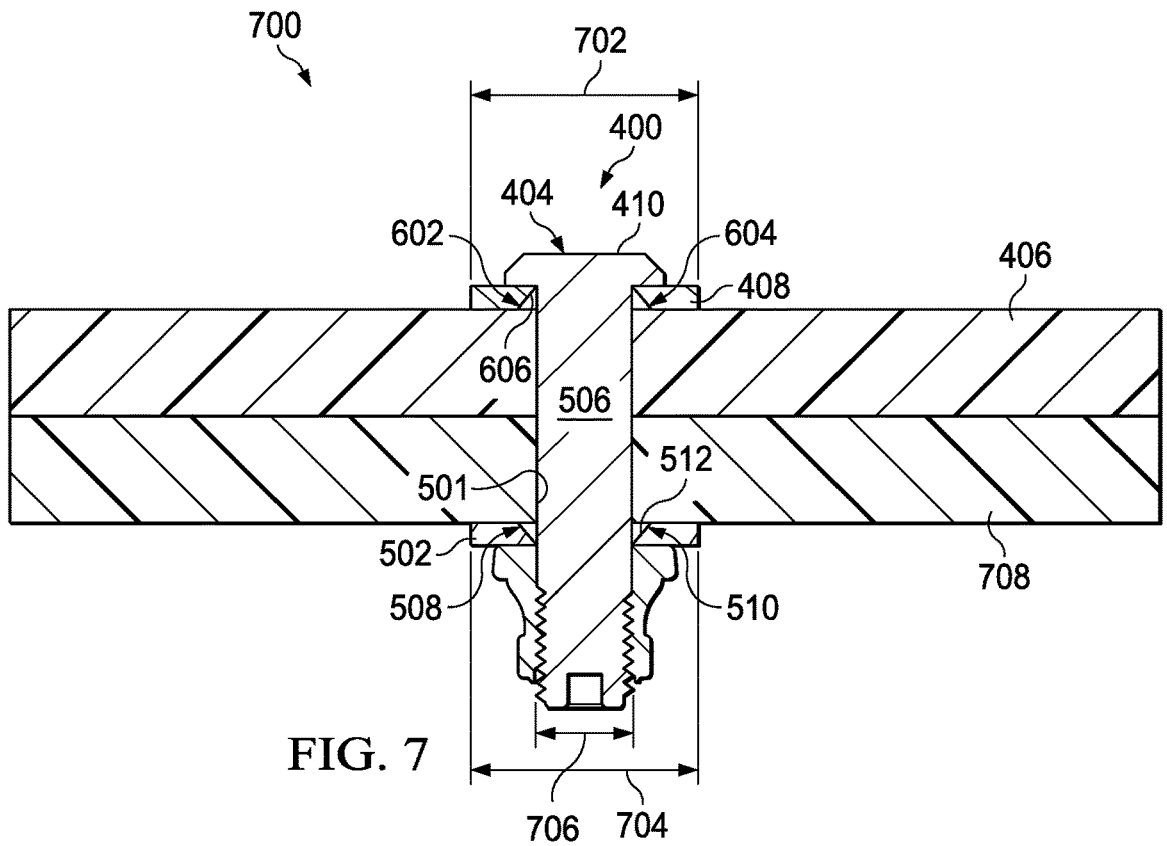
FIG. 7 is an illustration of a cross-sectional view of a fastening system in accordance with an illustrative embodiment.

Turning now to FIG. 7, an illustration of a cross-sectional view of a fastening system is depicted in accordance with an illustrative embodiment. View 700 is a cross-sectional view of fastening system 400 of FIG. 4 from direction 7 of FIG. 4.

View 700 is a cross-sectional view of fastening system 400 when assembled. Fastening system 400 has fastener 404, washer 408, second washer 502, and collar 504. Fastener 404 has shaft 506 extending through hole 501 in composite panel 406. In view 700, washer 408 is concentrically positioned on shaft 506 between head 410 of fastener 404 and composite panel 406. Washer 408 comprises enlarged bore 602 facing composite panel 406. Enlarged bore 602 is conical 604 countersunk bore 606. Collar 504 secures fastener 404 relative to composite panel 406.

Second washer 502 is concentrically positioned on shaft 506 between collar 504 and composite panel 406. Second washer 502 comprises enlarged bore 508 facing composite panel 406. Enlarged bore 508 is conical 510 countersunk bore 512.

In this illustrative example, outer diameter 702 of washer 408 and outer diameter 704 of second washer 502 are the same. As depicted outer diameter 702 of washer 408 is greater than or equal to 180% of diameter 706 of shaft 506.

As depicted, diameter 514 is in the range of 1.04 times diameter 516 and 80% of outer dimeter 704. As depicted, diameter 608 is in the range of 1.04 times diameter 610 and 80% of outer diameter 702.

As depicted, fastener system 400 connects composite panel 406 to composite panel 708. Although fastener system 400 is depicted as extending through both composite panel 406 and composite panel 708 to directly connect composite panel 406 and composite panel 708, in other illustrative examples, composite panel 406 may be indirectly connected to composite panel 708. For example, a secondary component may be connected to composite panel 406 using fastener system 400.

Figure 8:
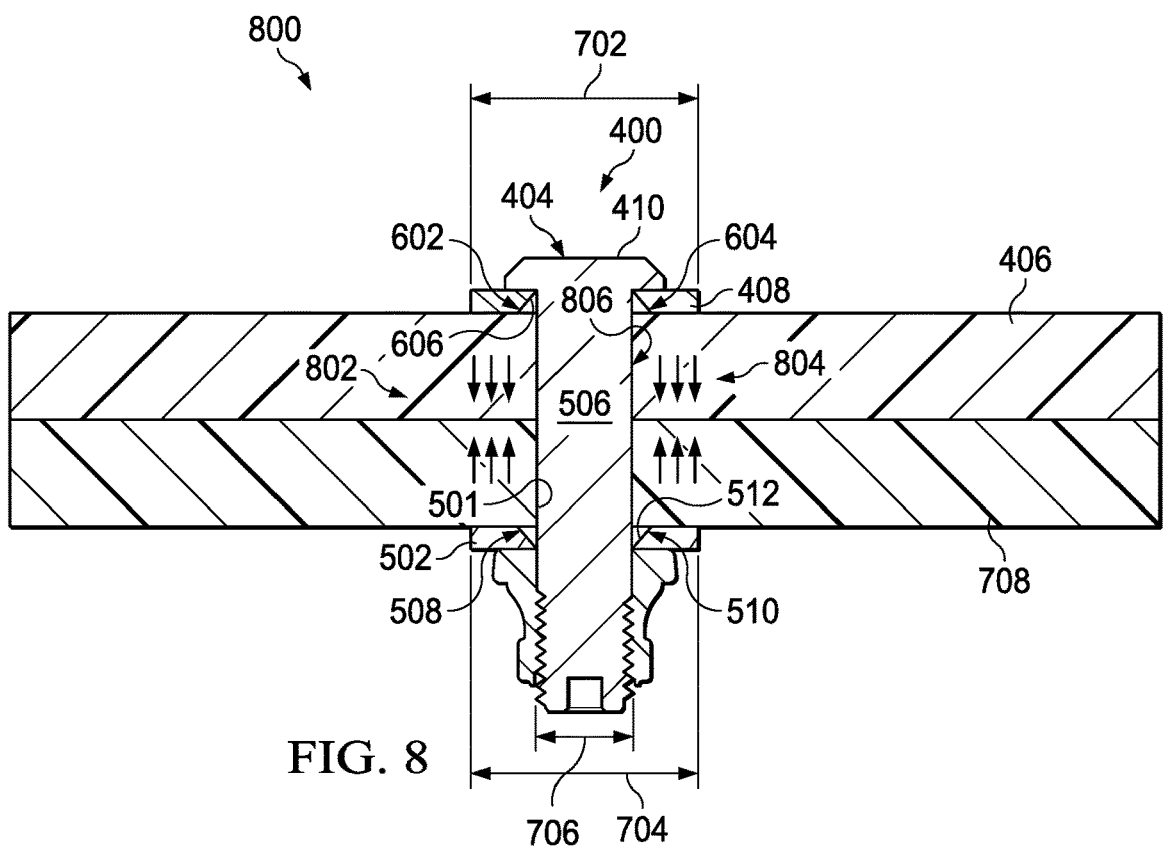
FIG. 8 is an illustration of a cross-sectional view of a fastening system with illustrated forces in accordance with an illustrative embodiment.

Turning now to FIG. 8, an illustration of a cross-sectional view of a fastening system with illustrated forces is depicted in accordance with an illustrative embodiment. In view 800, force is applied to fastener 404.

When a force is applied to fastener 404, washer 408 creates a smaller stress in composite panel 406 due to the force than head 410 of fastener 404 without washer 408. When a force is applied to fastener 404, fastening system 400 introduces the force from fastener 404 into composite panel 406. Washer 408 transmits the force into composite panel 406 across area 802 beginning distance 803 away from edge 806 of hole 501. Fastening system 400 pushes the clamp up load/force 804 away from edge 806 of hole 501 when the structure is experiencing hole stress and improves the stress performance of hole.

Enlarged bore 602 is selected to introduce forces from fastener 404 distance 803 from edge 806 of hole 501. Distance 803 is changed by changing diameter 608 of enlarged bore 602. Increasing diameter 608 increases distance 803.

Figure 9:
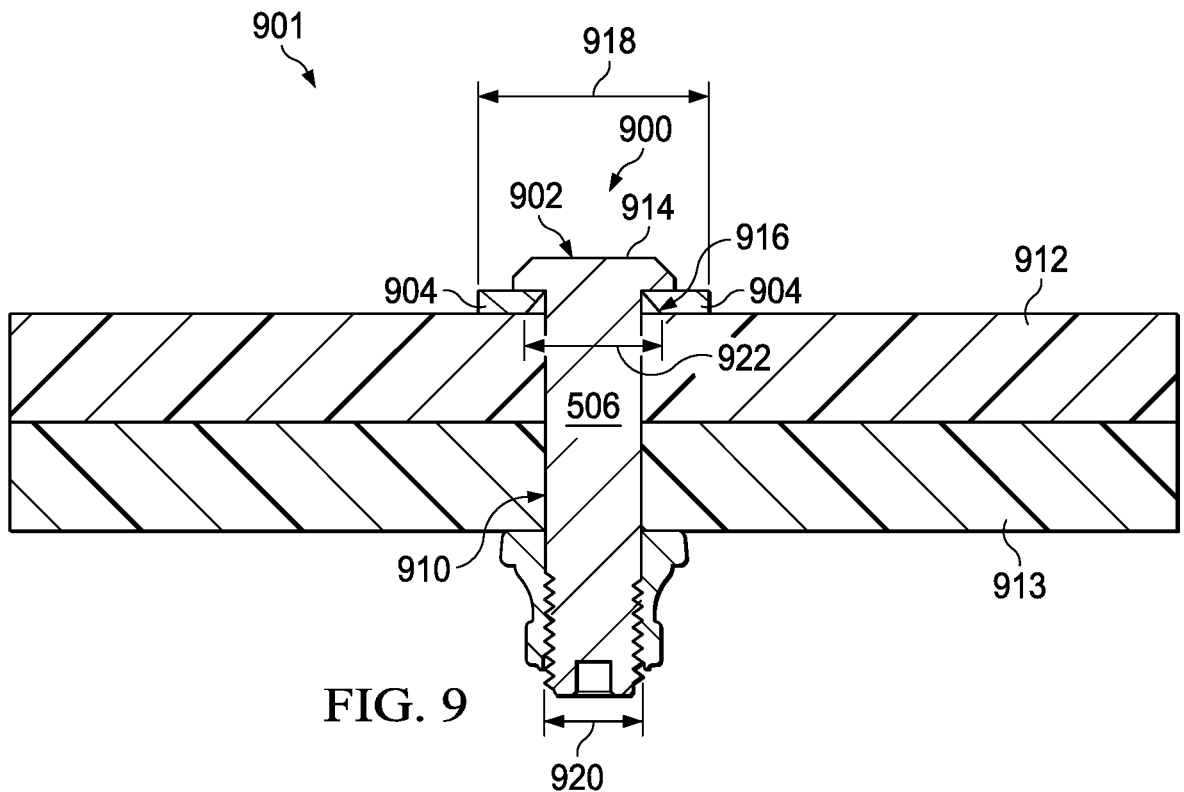
FIG. 9 is an illustration of a cross-sectional view of a fastening system in accordance with an illustrative embodiment.

Turning now to FIG. 9, an illustration of a cross-sectional view of a fastening system is depicted in accordance with an illustrative embodiment. Fastening system 900 is a physical implementation of fastening system 210 of FIG. 2. In some illustrative examples, fastening system 900 is one of plurality of fastening systems 304 of FIG. 3. For example, view 901 of fastening system 900 may be a view in direction 9 of FIG. 3.

Fastening system 900 comprises fastener 902, washer 904, and collar 906. Fastener 902 has shaft 908 extending through hole 910 in composite panel 912. Composite panel 912 is a physical implementation of composite panel 206 of FIG. 2. In some illustrative examples, composite panel 912 is composite panel 302 of FIG. 3.

As depicted, fastener system 900 connects composite panel 912 to composite panel 913. Although fastener system 900 is depicted as extending through both composite panel 912 and composite panel 913 to directly connect composite panel 912 and composite panel 913, in other illustrative examples, composite panel 912 may be indirectly connected to composite panel 913. For example, a secondary component may be connected to composite panel 912 using fastener system 900.

Washer 904 is concentrically positioned on shaft 908 between head 914 of fastener 902 and composite panel 912. Washer 904 comprises enlarged bore 916 facing composite panel 912. Enlarged bore 916 may be one of a chamfered bore or a countersunk bore. In this illustrative example, enlarged bore 916 is conical. In other illustrative examples, enlarged bore 916 is cylindrical. Collar 906 secures fastener 902 relative to composite panel 912. In this illustrative example, outer diameter 918 of washer 904 is greater than or equal to 180% of diameter 920 of shaft 908.

Figure 10:
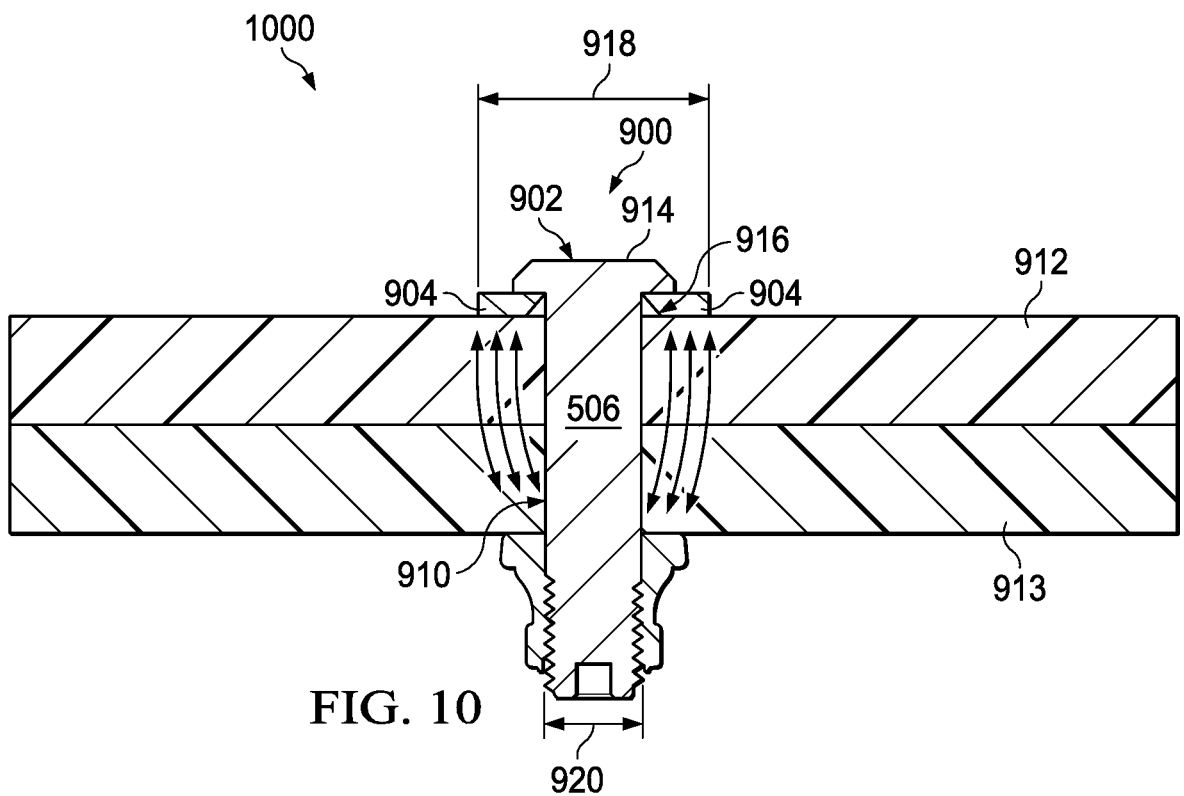
FIG. 10 is an illustration of a cross-sectional view of a fastening system with illustrated forces in accordance with an illustrative embodiment.

Turning now to FIG. 10, an illustration of a cross-sectional view of a fastening system with illustrated forces is depicted in accordance with an illustrative embodiment. In view 1000, a force is applied to fastener 902 of fastening system 900. When a force is applied to fastener 902, fastener system 900 is configured to introduce the force from fastener 902 into a larger area than head 914 of fastener 902. Fastener system 900 increases a strength of the composite joint from a filled-hole strength for hole 910.

When a force is applied to fastener 902, washer 904 creates a smaller stress in composite panel 912 due to the force than head 914 of fastener 902 without washer 904. When a force is applied to fastener 902, fastening system 900 introduces the force from fastener 902 into a larger area 1002 than head 914 of fastener 902. Washer 904 distributes the force into composite panel 912 across a larger area 1002 than head 914 of fastener 902. Fastening system 900 pushes the clamp up load/force 1004 away from edge 1006 of hole 910 when the structure is experiencing hole stress and improves the stress performance of hole.

Figure 11:
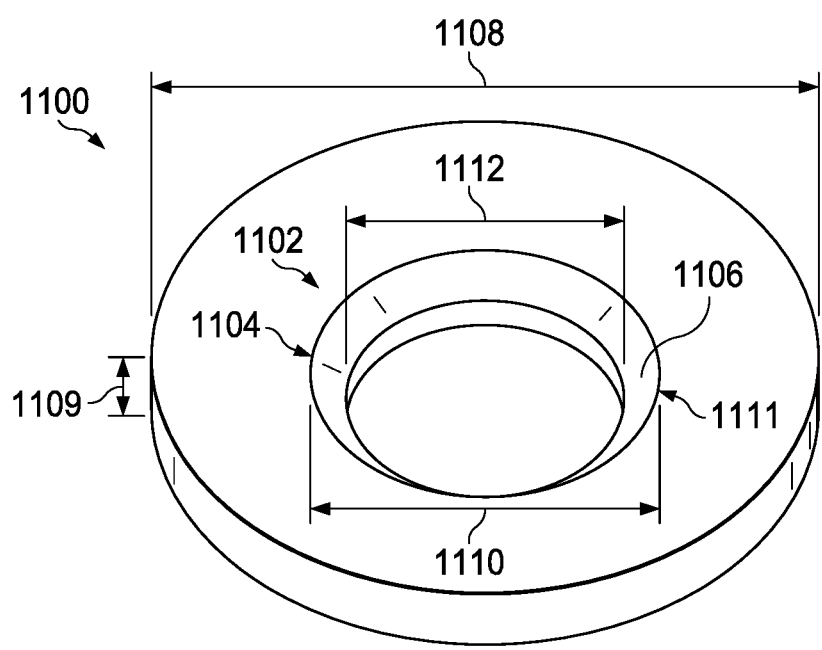
FIG. 11 is an illustration of an isometric view of a washer in accordance with an illustrative embodiment.

Turning now to FIG. 11, an illustration of an isometric view of a washer is depicted in accordance with an illustrative embodiment. Washer 1100 is a physical implementation of at least one of washer 215, second washer 224, washer 251, or second washer 264.

Washer 1100 has enlarged bore 1102. As depicted, enlarged bore 1102 is conical 1104. In this illustrative example, enlarged bore 1102 is countersunk bore 1106.

Washer 1100 has outer diameter 1108. In some illustrative examples, outer diameter 1108 is desirably equal to or greater than a diameter of a fastener head to be used in conjunction with washer 1100. Increasing outer diameter 1108 increases the weight of washer 1100. Washer 1100 has thickness 1109. Increasing thickness 1109 increases the weight of washer 1100. It is desirable to minimize the weight of washer 1100 without undesirably affecting the tension strength of a composite joint.

Increasing the size of countersunk bore 1106 removes material to reduce the weight of washer 1100. Increasing the size of countersunk bore 1106 also distributes the force from a fastener into a composite panel a greater distance from an edge of a hole.

Increasing diameter 1110 reduces the weight of washer 1100. Increasing diameter 1110 also increases the distance of edge 1111 of countersunk bore 1106 to an edge of a hole of a composite panel. Diameter 1110 is in the range of 1.04 times diameter 1112 to 80% of outer diameter 1108.

Diameter 1112 is approximately the diameter of a shaft of a fastener. Outer diameter 1108 is at least 180% the size of diameter 1112.

Figure 12:
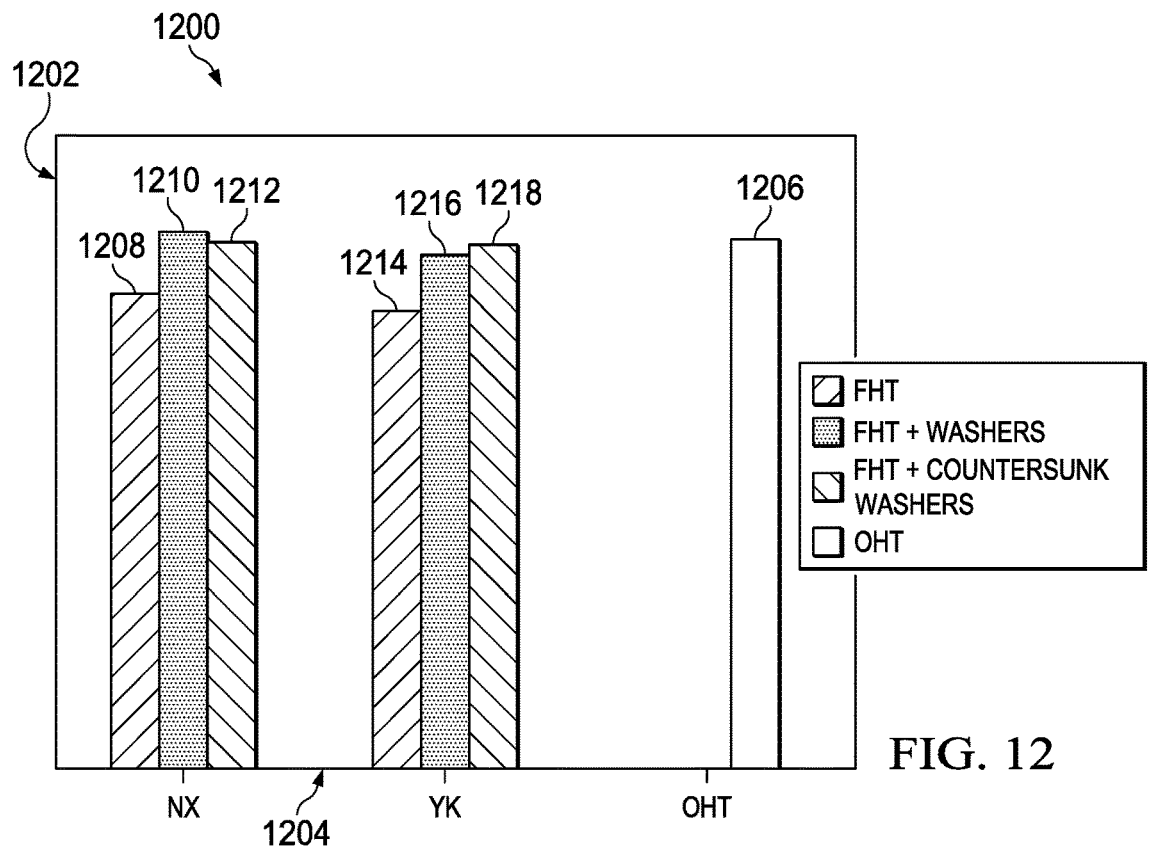
FIG. 12 is an illustration of bar chart of the influence of washers on strength of a composite joint in accordance with an illustrative embodiment.

Turning now to FIG. 12, an illustration of bar chart of the influence of washers on tension strength of a composite joint is depicted in accordance with an illustrative embodiment. Bar chart 1200 is a depiction of tension strength for fastening system 210 with FIG. 2. In some illustrative examples, bar chart 1200 is a depiction of tension strength for a fastening system in aircraft 100 of FIG. 1. Bar chart 1200 may be a depiction of tension strength for fastening system 400 of FIG. 4 or fastening system 900 of FIG. 9.

Bar chart 1200 has vertical axis 1202 and horizontal axis 1204. Vertical axis 1202 depicts tension strength of the bolted joint. Horizontal axis 1204 demonstrates different fastening systems under different clamping scenarios. Bar 1206 is a depiction of open-hole tension strength. Under open-hole tension (OHT), the composite panel is subjected to uniaxial tension. In open-hole tension, no bolt or other fastener is within the hole.

Bar 1208, bar 1210, and bar 1212 are representative of three different fastening systems with filled-hole tension. In filled-hole tension (FHT), the composite panels were subjected to uniaxial tension. In filled-hole tension, a bolt was inserted inside the hole.

Bar 1208, bar 1210, and bar 1212 are representative of three different fastening systems with 100% clamp-up load. Each of the fastening systems of bar 1208, bar 1210, and bar 1212 have metal fasteners. Each of bar 1208, bar 1210, and bar 1212 represent fastening systems with titanium fasteners. Each of the three fastening systems of bar 1208, bar 1210, and bar 1212 will have different contact stress distributions dependent on the presence and type of washers in each fastening system.

Bar 1208 represents a fastening system without a washer. Bar 1210 represents a fastening system with a corrosion resistant steel washer having a thickness of 0.125 inches, an inner diameter of 0.25 inches, and an outer diameter of one inch. Bar 1212 represents a fastening system with a countersunk washer with an outer diameter greater than or equal to 180% of the shaft diameter. More specifically, bar 1212 represents a fastening system with a countersunk corrosion resistant steel washer having the dimensions of 0.06" thickness, 0.23" outer diameter, and a 45 degree countersink with a shank diameter of 0.13" and a greatest diameter of 0.16".

Bar 1214, bar 1216, and bar 1218 are representative of three different fastening systems with 100% clamp-up load. Each of the fastening systems of bar 1214, bar 1216, and bar 1218 have a fastener formed of a different material than the fasteners of bar 1208, bar 1210, bar 1212. In this illustrative example, each of the fastening systems of bar 1214, bar 1216, and bar 1218 have fasteners formed of Inconel. Each of the three fastening systems of bar 1214, bar 1216, and bar 1218 will have different contact stress distributions dependent on the presence and type of washers in each fastening system.

Bar 1214 represents a fastening system without a washer. Bar 1216 represents a fastening system with a corrosion resistant steel washer having a thickness of 0.125 inches, an inner diameter of 0.25 inches, and an outer diameter of one inch. Bar 1218 represents a fastening system with a countersunk washer with an outer diameter greater than or equal to 180% of the shaft diameter. Bar 1218 represents a fastening system with a countersunk corrosion resistant steel washer having the dimensions of 0.06" thickness, 0.23" outer diameter, and a 45 degree countersink with a shank diameter of 0.13" and a greatest diameter of 0.16". In each of bar 1216 and bar 1218 washers inserted between the bolt head and the composite laminate distribute the clamp-up load.

As can be seen in bar chart 1200, the tension strength of a composite joint with a countersunk washer under clamp-up load in bar 1212 is substantially the same as the tension strength of a composite joint with the washer under clamp-up load in bar 1210. As can be seen in bar chart 1200, the tension strength of a composite joint with countersunk washer under clamp-up load in bar 1218 is substantially the same as the tension strength of a composite joint with the washer under clamp-up load in bar 1216.

As can be seen in bar chart 1200, the tension strength of a composite joint with a countersunk washer is greater than a fastener system without any washers. Also, as can be seen in bar chart 1200, using thinner countersunk washers with a smaller outer diameter rather than washers with standard, non-enlarged, bores does not undesirably affect the tension strength of the resulting composite joint. A composite joint formed with fastener systems having countersunk washers facing the composite material has a same tension strength as a composite joint formed with fastener systems having larger washers. Using smaller countersunk washers will reduce the weight of a composite joint and provide the same or better tension strength than heavier and larger standard washers.

Figure 13:
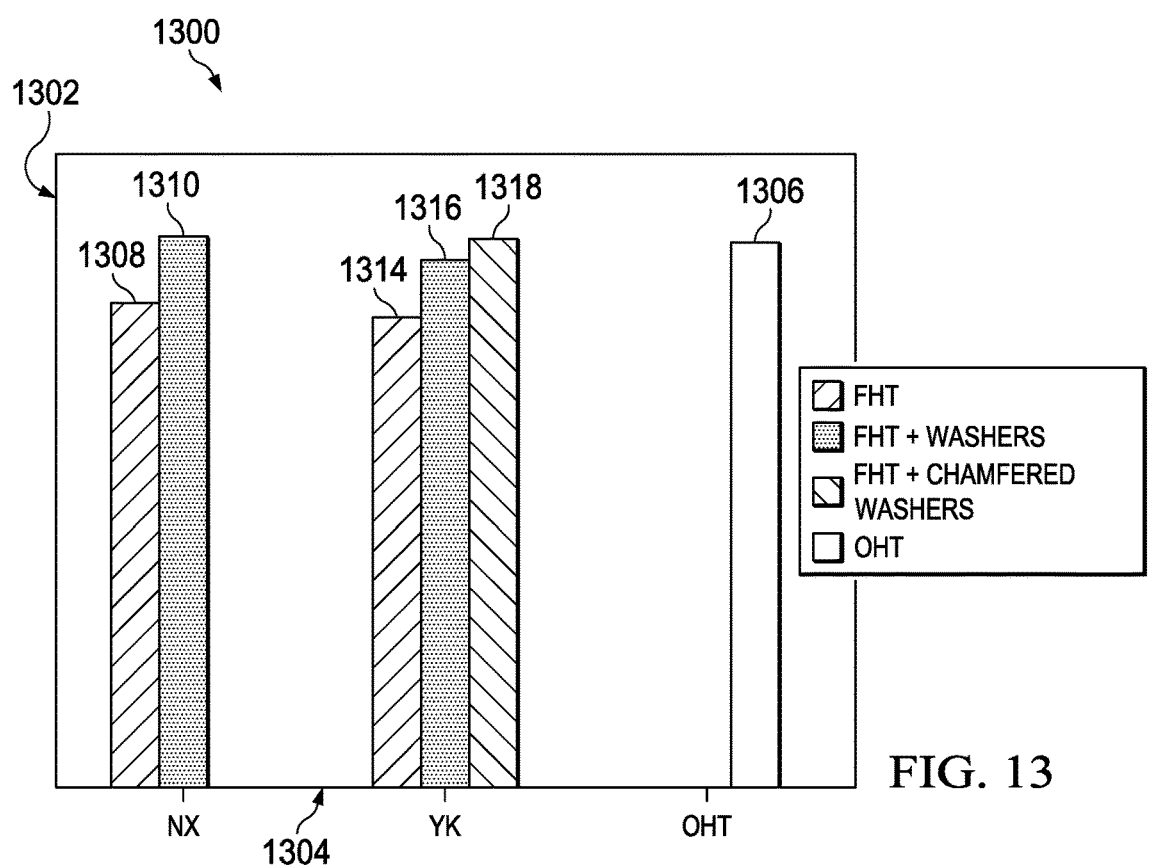
FIG. 13 is an illustration of bar chart of the influence of washers on strength of a composite joint in accordance with an illustrative embodiment.

Turning now to FIG. 13, an illustration of bar chart of the influence of washers on tension strength of a composite joint is depicted in accordance with an illustrative embodiment. Bar chart 1300 is a depiction of tension strength for fastening system 210 with FIG. 2. In some illustrative examples, bar chart 1300 is a depiction of tension strength for a fastening system in aircraft 100 of FIG. 1. Bar chart 1300 may be a depiction of tension strength for fastening system 400 of FIG. 4 or fastening system 900 of FIG. 9.

Bar chart 1300 has vertical axis 1302 and horizontal axis 1304. Vertical axis 1302 depicts tension strength of the bolted joint. Horizontal axis 1304 demonstrates different fastening systems under different clamping scenarios. Bar 1306 is a depiction of open-hole tension strength. Under open-hole tension (OHT), the composite panel is subjected to uniaxial tension. In open-hole tension, no bolt or other fastener is within the hole.

Bar 1308 and bar 1310 are representative of two different fastening systems with filled-hole tension. In filled-hole tension (FHT), the composite panels were subjected to uniaxial tension. In filled-hole tension, a bolt was inserted inside the hole.

Bar 1308 and bar 1310 are representative of two different fastening systems with a 100% clamp-up load. Each of the fastening systems of bar 1308 and bar 1310 have metal fasteners. Each of bar 1308 and bar 1310 represent fastening systems with titanium fasteners. Each of the three fastening systems of bar 1308 and bar 1310 will have different contact stress distributions dependent on the presence and type of washers in each fastening system.

Bar 1308 represents a fastening system without a washer. Bar 1310 represents a fastening system with a corrosion resistant steel washer having a thickness of 0.125 inches, an inner diameter of 0.25 inches, and an outer diameter of one inch.

Bar 1314, bar 1316, and bar 1318 are representative of three different fastening systems with a 100% clamp-up load. Each of the fastening systems of bar 1314, bar 1316, and bar 1318 have a fastener formed of a different material than the fasteners of bar 1308 and bar 1310. In this illustrative example, each of the fastening systems of bar 1314, bar 1316, and bar 1318 have fasteners formed of Inconel. Each of the three fastening systems of bar 1314, bar 1316, and bar 1318 will have different contact stress distributions dependent on the presence and type of washers in each fastening system.

Bar 1314 represents a fastening system without a washer. Bar 1316 represents a fastening system with a corrosion resistant steel washer having a thickness of 0.125 inches, an inner diameter of 0.25 inches, and an outer diameter of one inch. Bar 1318 represents a fastening system with a chamfered washer with an outer diameter greater than or equal to 180% of the shaft diameter. Bar 1318 represents a fastening system with a chamfered corrosion resistant steel washer having the dimensions of the washer in the fastening system of bar 1316. The chamfer in this illustrative example is a 45 degree chamfer with a height and width each measuring 0.02 inches. In each of bar 1316 and bar 1318 washers inserted between the bolt head and the composite laminate distribute the clamp-up load. In bar 1318, the chamfer distributes the load away from the edge of the hole.

As can be seen in bar chart 1300, the tension strength of a composite joint with a chamfered washer is greater than a fastener system without any washers. Also, as can be seen in bar chart 1300, introducing a chamfer provides moderately better tension strength than washers without a chamfer, and reduces the weight of the washer. Although a chamfer may present only a small weight savings, the cumulative weight savings over several washers may be substantial.

Figure 14:
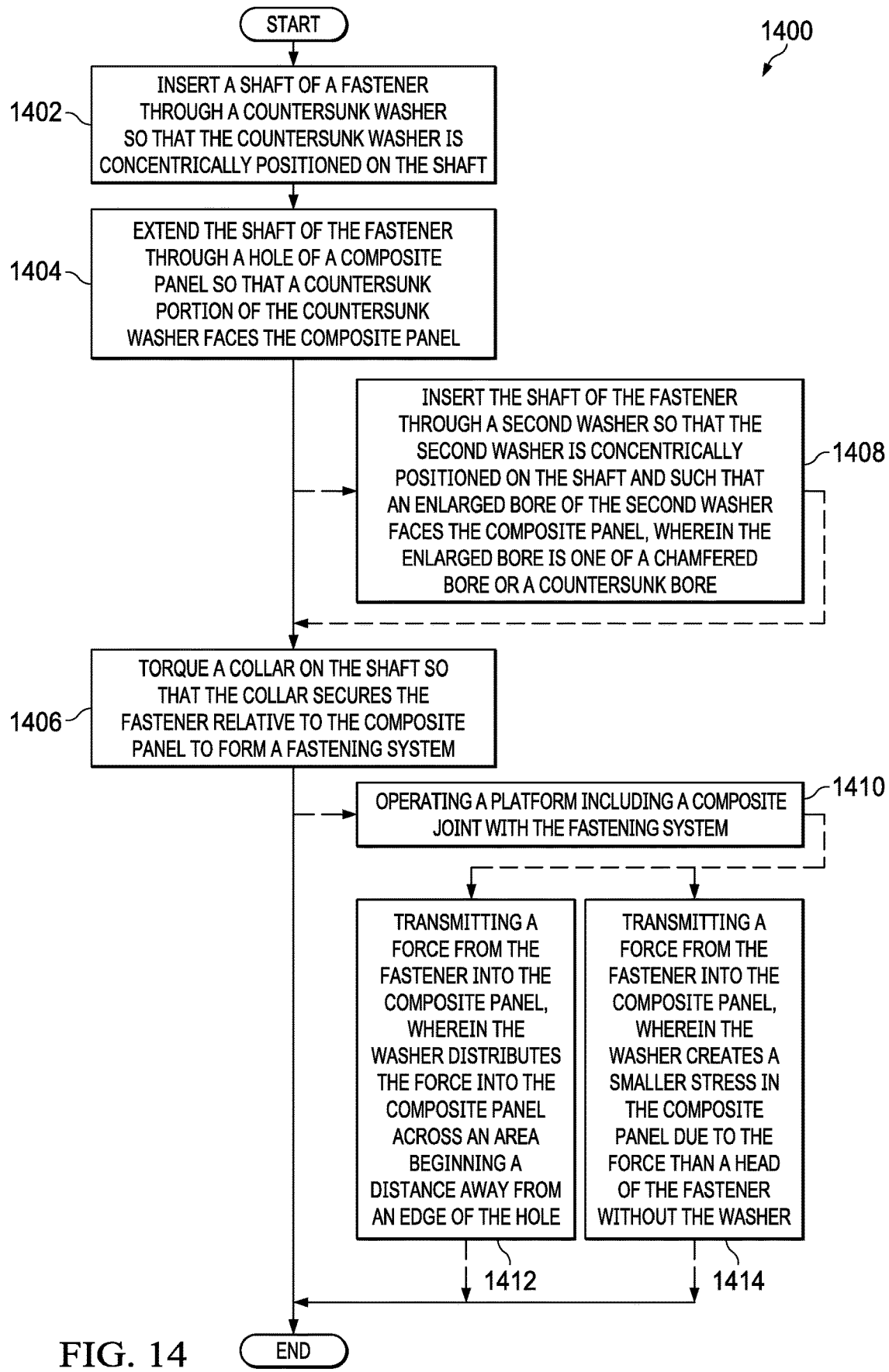
FIG. 14 is an illustration of a flowchart of a method for forming a fastening system in accordance with an illustrative embodiment.

Turning now to FIG. 14, an illustration of a flowchart of a method for forming a fastening system is depicted in accordance with an illustrative embodiment. Method 1400 is a method of forming a fastening system, such as fastening system 210 or fastening system 212 of FIG. 2. Method 1400 may be used to install fastening systems to join composite panels of aircraft 100. Method 1400 may be implemented to form composite joint 300 of FIG. 3. Method 1400 may be implemented to form fastening system 400 of FIG. 4 or fastening system 900 of FIG. 9.

Method 1400 inserts a shaft of a fastener through a washer so that the washer is concentrically positioned on the shaft (operation 1402). Method extends the shaft of the fastener through a hole of a composite panel so that an enlarged bore of the washer faces the composite panel, wherein the enlarged bore is one of a chamfered bore or a countersunk bore (operation 1404). Method 1400 torques a collar on the shaft so that the collar secures the fastener relative to the composite panel to form a fastening system (operation 1406). Afterwards, the method terminates.

In some illustrative examples, method 1400 further comprises inserting the shaft of the fastener through a second washer so that the second washer is concentrically positioned on the shaft and such that an enlarged bore of the second washer faces the composite panel, wherein the enlarged bore is one of a chamfered bore or a countersunk bore (operation 1408). In these illustrative examples, the fastening system has two washers.

In some illustrative examples, method 1400 further comprises operating a platform including a composite joint with the fastening system (operation 1410). The platform may take any desirable form. In some illustrative examples, the platform is aircraft 100 of FIG. 1. In some illustrative examples, method 1400 transmits a force from the fastener into the composite panel, wherein the washer distributes the force into the composite panel across an area beginning a distance away from an edge of the hole (operation 1412). In some illustrative examples, the distance is determined by a diameter of the enlarged bore. In some illustrative examples, method 1400 transmits a force from the fastener into the composite panel, wherein the washer creates a smaller stress in the composite panel due to the force than a head of the fastener without the washer (operation 1414).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 1400 are implemented. For example, operation 1408 is optional. When the fastening system only has one washer, operation 1408 is not performed.

Figure 15:
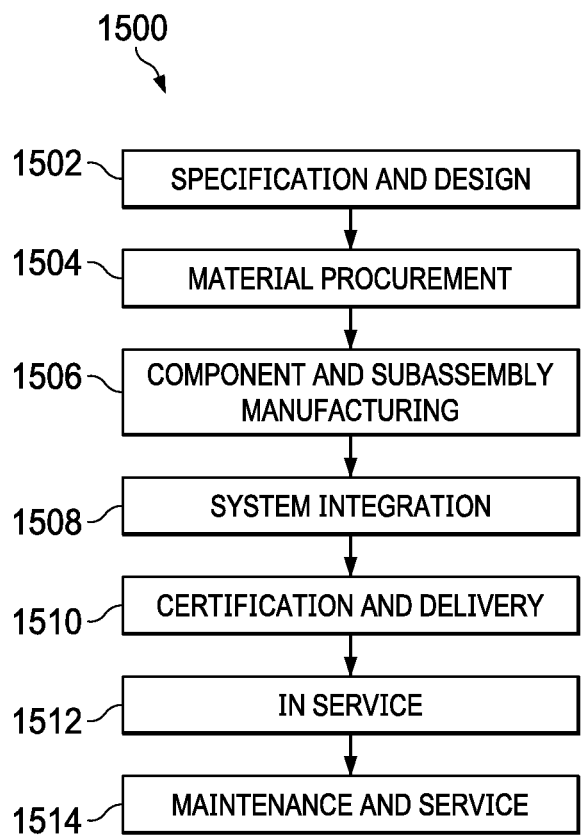
FIG. 15 is an illustration of an aircraft manufacturing and service method in the form of a block diagram in accordance with an illustrative embodiment.
Figure 16:
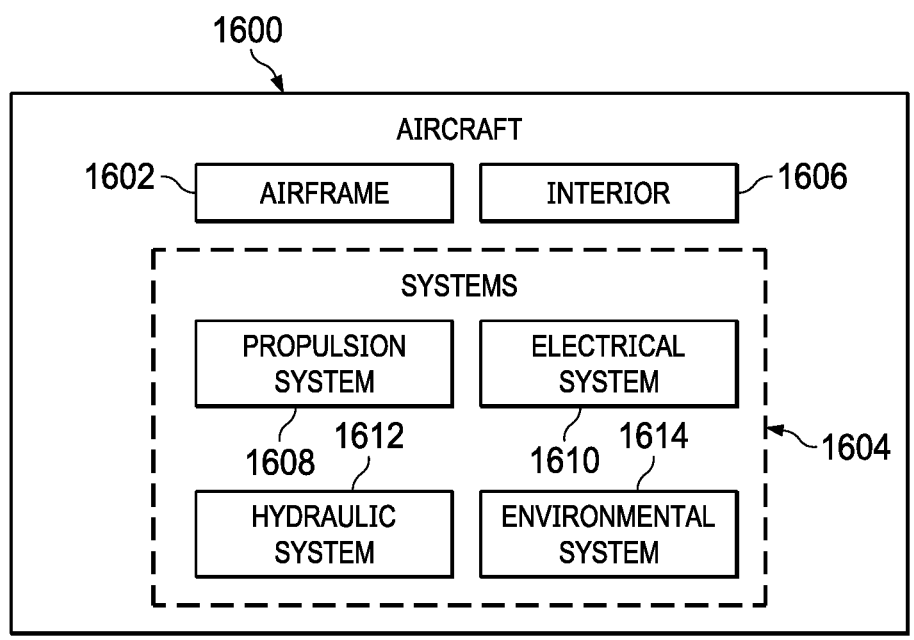
FIG. 16 is an illustration of an aircraft in the form of a block diagram in which an illustrative embodiment may be implemented.

Illustrative embodiments of the present disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 takes place. Thereafter, aircraft 1600 may go through certification and delivery 1510 in order to be placed in service 1512. While in service 1512 by a customer, aircraft 1600 is scheduled for routine maintenance and service 1514, which may include modification, reconfiguration, refurbishment, or other maintenance and service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 of FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500. One or more illustrative embodiments may be used during at least one of component and subassembly manufacturing 1506, system integration 1508, or maintenance and service 1514 of FIG.

15. For example, plurality of fastening systems 204 of FIG. 2 may be used during component and subassembly manufacturing 1506 to assemble composite joint 200 of FIG. 2. Fastening system 210 of FIG. 2 may be assembled during component and subassembly manufacturing 1506 using method 1400 of FIG. 14.

At least one of fastening system 210 or fastening system 212 of FIG. 2 may be used to connect components of aircraft 1600 during system integration 1508. Plurality of fastening systems 204 may be used to form replacement components used during maintenance and service 1514 of FIG. 15. For example, plurality of fastening systems 204 are used to create composite joint 200 to form replacement components used during maintenance and service 1514 of FIG. 15. Composite panel 206 of FIG. 2 may be at least a component of airframe 1602 or interior 1606.

The illustrative examples increase the filled-hole tension capability of composite laminates in bolted joints. The illustrative examples may replace straps or plates in conventional composite joints with washers having enlarged bores. Washers with enlarged bores may a reduced weight compared to conventional metal or composite straps. Further, washers with enlarged bores may have a reduced weight compared to large washers.

An extra-large washer will increase the contact area between the washer and the composite panel. Increasing the contact area reduces the clamp-up stress the composite laminate panel is experiencing. As a result, its strength increases 4 to 35% when compared to identical configurations installed with or without standard washers.

The illustrative examples improve hole stress characteristics and can improve free hole tension allowables in a fastened composite structure. The illustrative examples push the clamp up load/force away from the hole edge when the structure is experiencing hole stress and improves the stress performance of the hole.

The illustrative examples introduce forces away from the hole edge by having an enlarged bore facing the composite structure. The enlarged bore is at least 1.04 times the size of the shank diameter of the washer to introduce loads way from the hole edge. The enlarged bore is up to 0.80 times the outer diameter of the washer to discourage the washer "biting" into the composite structure.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A fastening system comprising:
a fastener having a shaft extending through a hole in a composite panel;
a single primary unitarily formed washer concentrically positioned on the shaft between a head of the fastener and the composite panel and in direct contact with the head of the fastener and the composite panel, wherein the primary washer comprises an enlarged bore facing the composite panel, wherein the enlarged bore is one of a chamfered bore or a countersunk bore;
a second washer having no contact with the primary washer is concentrically positioned on the shaft between the collar and a second composite panel, wherein the second washer comprises an enlarged bore facing the second composite panel, wherein the enlarged bore of the second washer is one of a chamfered bore or a countersunk bore; and
a collar securing the fastener relative to the composite panel.

2. The fastening system of claim 1, wherein an outer diameter of the primary washer and an outer diameter of the second washer are the same.

3. The fastening system of claim 1, wherein an outer diameter of the primary washer or the second washer is greater than or equal to 180% of a diameter of the shaft.

4. The fastening system of claim 1, wherein a diameter of the enlarged bore of the primary washer is up to 80% of an outer diameter of the primary washer.

5. The fastening system of claim 1, wherein a diameter of the enlarged bore of the primary washer is at least 1.04 times a smallest diameter of the enlarged bore of the primary washer.

6. The fastening system of claim 1, wherein the fastening system is configured to introduce forces from the fastener into the composite panel a distance from an edge of the hole, wherein the distance is determined by a largest diameter of the enlarged bore of the primary washer.

7. The fastening system of claim 1, wherein the enlarged bore of the primary washer or the second washer is conical.

8. A composite joint comprising:
a composite panel having a plurality of holes;
a plurality of fastening systems, each fastening system of the plurality of fastening systems comprising:
a fastener having a shaft extending through a hole of the plurality of holes in the composite panel;
a single primary unitarily formed washer concentrically positioned on the shaft between a head of the fastener and the composite panel and in direct contact with the head of the fastener and the composite panel, wherein the primary washer comprises an enlarged bore facing the composite panel, wherein the enlarged bore is one of a chamfered bore or a countersunk bore;
a second washer having no contact with the primary washer is concentrically positioned on the shaft between the collar and a second composite panel, wherein the second washer comprises an enlarged bore facing the second composite panel, wherein the enlarged bore is one of a chamfered bore or a countersunk bore; and
a collar securing the fastener relative to the composite panel.

9. The composite joint of claim 8, wherein each of the plurality of fastening systems is the same as each other fastening system of the plurality of fastening systems.

10. The composite joint of claim 8, wherein the plurality of fastening systems is configured to increase a strength of the composite joint from a filled-hole strength.

11. The composite joint of claim 8, wherein each of the plurality of fastening systems is configured to introduce forces from a respective fastener into the composite panel a distance from an edge of a respective hole of the plurality of holes.

12. The composite joint of claim 11, wherein the distance from the edge for each of the plurality of fastening systems is determined by a respective largest diameter of a respective enlarged bore of a respective primary washer.

13. The composite joint of claim 12, wherein each respective largest diameter is in a range of 1.04 times a smallest diameter of the respective enlarged bore and 80% of an outer diameter of the respective primary washer.

14. The composite joint of claim 8, wherein an outer diameter of the primary washer and an outer diameter of the second washer are the same.

15. The composite joint of claim 8, wherein an outer diameter of the primary washer or the second washer is greater than or equal to 180% of a diameter of the shaft.

16. A method comprising:
  inserting a shaft of a fastener through a single primary unitarily formed washer so that the washer is concentrically positioned on the shaft;
  extending the shaft of the fastener through a hole of a composite panel so that the washer directly contacts a head of the fastener and the composite panel and so that an enlarged bore of the primary washer faces the composite panel, wherein the enlarged bore is one of a chamfered bore or a countersunk bore;
  inserting the shaft of the fastener through a second washer so that the second washer is concentrically positioned on the shaft and has no contact with the primary washer and such that an enlarged bore of the second washer faces a second composite panel, wherein the enlarged bore of the second washer is one of a chamfered bore or a countersunk bore; and
  torquing a collar on the shaft so that the collar secures the fastener relative to the composite panel to form a fastening system.

17. The method of claim 16,
  wherein torquing the collar on the shaft secures the composite panel to the second composite panel.

18. The method of claim 16 further comprising:
  operating a platform including a composite joint with the fastening system; and
  transmitting a force from the fastener into the composite panel, wherein the primary washer distributes the force into the composite panel across an area beginning a distance away from an edge of the hole.

19. The method of claim 18, wherein the distance is determined by a diameter of the enlarged bore of the primary washer.

20. The method of claim 16 further comprising:
  operating a platform including a composite joint with the fastening system; and
  transmitting a force from the fastener into the composite panel, wherein the primary washer creates a smaller stress in the composite panel due to the force than the head of the fastener without the primary washer.

* * * * *